Feb. 19, 1946.   T. W. KELLER   2,394,999
PIEZOELECTRIC CRYSTAL HOLDER
Filed July 12, 1943   3 Sheets-Sheet 1
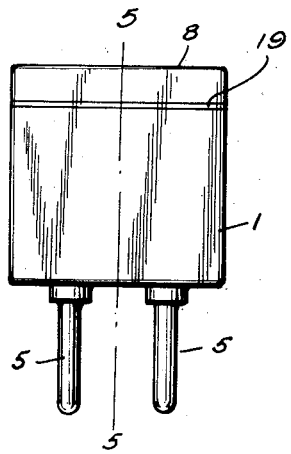
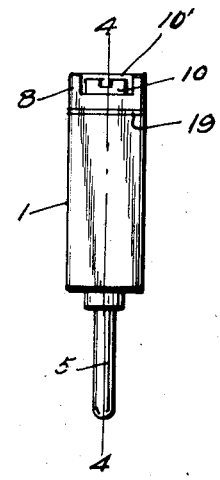
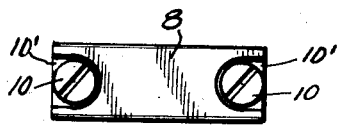
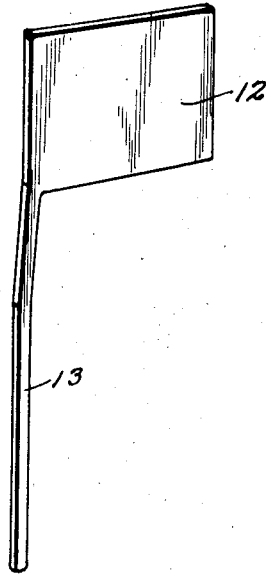
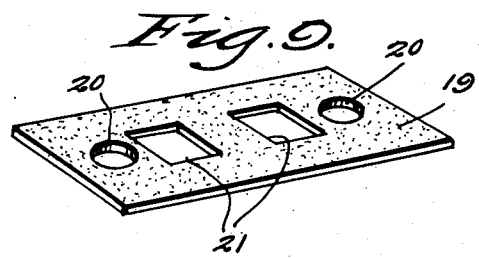
Inventor
Theodore W. Keller
By Clarence A. O'Brien
and Harvey B. Jacobson
Attorneys Feb. 19, 1946. T. W. KELLER 2,394,999
PIEZOELECTRIC CRYSTAL HOLDER
Filed July 12, 1943 3 Sheets-Sheet 2
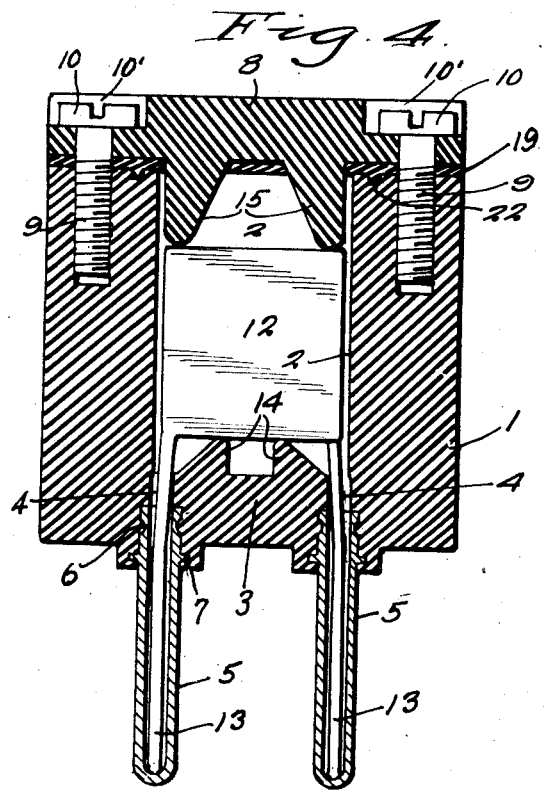
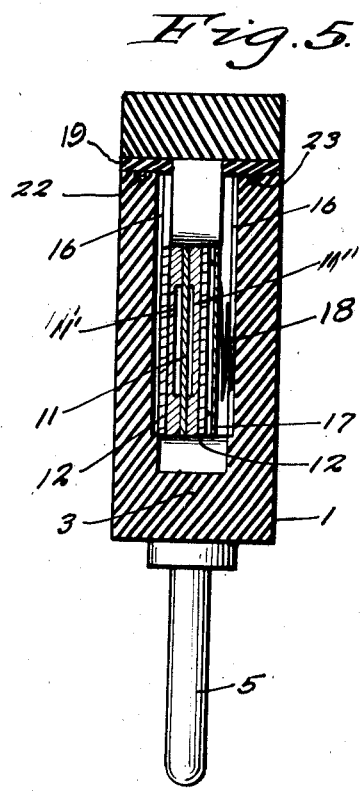
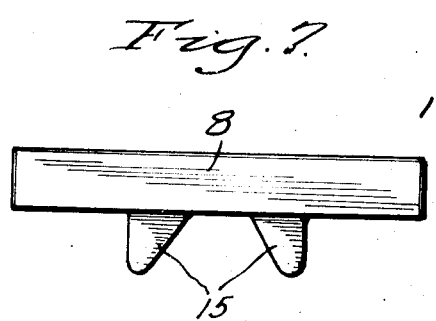
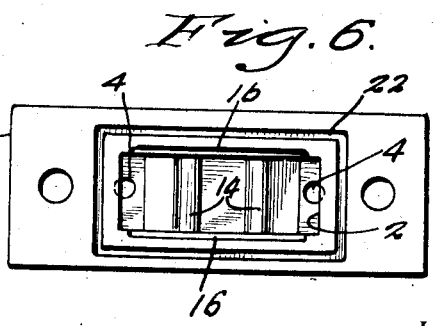
Inventor
Theodore W. Keller
By Clarence A. O'Brien
and Harvey B. Jacobson
Attorneys Feb. 19, 1946. T. W. KELLER 2,394,999
PIEZOELECTRIC CRYSTAL HOLDER
Filed July 12, 1943 3 Sheets-Sheet 3
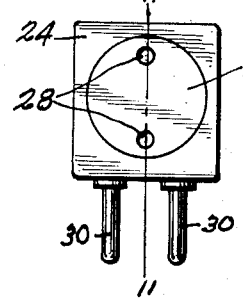
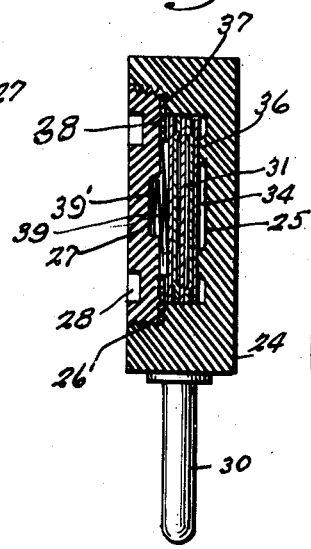
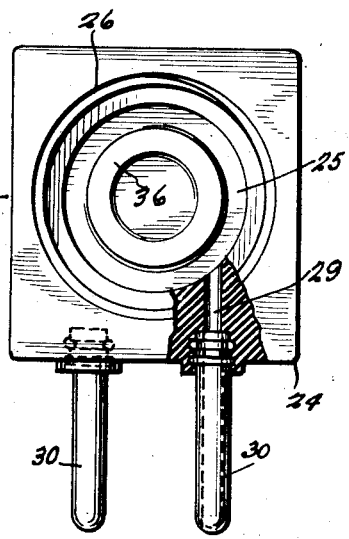
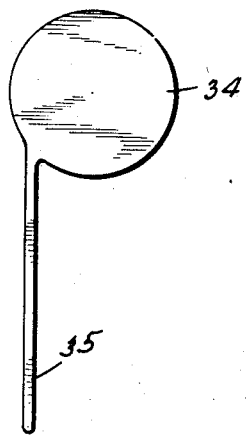
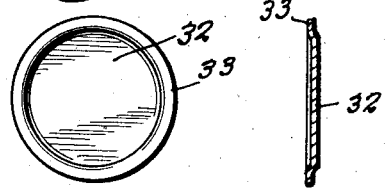
Inventor
Theodore W. Keller
By Clarence A. O'Brien
and Harvey B. Jacobson
Attorneys Patented Feb. 19, 1946

2,394,999

UNITED STATES PATENT OFFICE 2,394,999

PIEZOELECTRIC CRYSTAL HOLDER

Theodore W. Keller, Council Bluffs, Iowa

Application July 12, 1943, Serial No. 494,391

4 Claims. (Cl. 171—327)

My invention relates to piezoelectric crystal holders of the general type disclosed in my copending application Serial No. 484,052, filed April 22, 1943, and over which the present invention is designed as an improvement.

Among the important objects of the present invention are to provide for assembling the parts in an easier manner than in the holder of my application, supra, and also than in other devices of similar character and either from the top end, or the side of the body of the holder, to improve upon the means for sealing the holder against accumulation therein of vapor, gas or water, to provide improved means for insulating the sandwich, and for obviating interference with oscillation of the crystal, and to generally simplify the structure and manufacture of such devices.

Further and subordinate objects are also comprehended by my invention, all of which, together with the precise nature of my improvements, will be readily understood when the succeeding description and claims are read with reference to the drawings, accompanying and forming part of this specification.

In said drawings:

Figure 1 is a view in side elevation of a piezoelectric crystal holder constructed in accordance with my invention in its preferred embodiment, Figure 2 is a view in edge elevation of the same, Figure 3 is a view in end elevation of the same, Figure 4 is a view in longitudinal section taken on the line 4—4 of Figure 2 and drawn to an enlarged scale, Figure 5 is a view in transverse section taken on the line 5—5 of Figure 1 and drawn to an enlarged scale, Figure 6 is a view in end elevation with the cover plate removed, Figure 7 is a view in side elevation of the cover plate, Figure 8 is a view in perspective of one of the terminal plates, Figure 9 is a similar view of the sealing gasket for the cover plate, Figure 10 is a view in side elevation of a modified embodiment of my improved holder, Figure 11 is a view in longitudinal section taken on the line 11—11 of Figure 10, Figure 12 is a view in side elevation with the cover plate removed and the parts shown in section, Figure 13 is a view in side elevation of one of the terminal plates of the modified embodiment, Figure 14 is a view in side elevation of one of the electrodes of the modified embodiment, and Figure 15 is a view in diametrical section of said electrode.

Referring to the drawings by numerals, and first to Figures 1 to 9, thereof, in the preferred embodiment thereof, my improved holder comprises a rectangular, flat, block-like body 1 of suitable insulation material, preferably a plastic, which has formed therein a rectangular, shallow, central cavity 2 including a bottom 3 and opening at one end onto what constitutes the top end of the body 1. The bottom end of the cavity 2 opens at the edges of the same into a pair of counterbores 4 aligned with a pair of the usual hollow prongs 5 having inner ends grooved, as at 6, and flanged, as at 7, for anchoring in the bottom of the body 1.

The upper, or top end of the body 1 is closed by a cover plate 8, of the same material as said body, and which is secured to the body by a pair of screws 9 having heads 10 counter-sunk in recesses 10' formed in said plate.

The cavity 2 houses the sandwich including the crystal 11 interposed between suitable electrode plates, as at 11', and between the square terminal plates 12, said plates 12 being provided with offset corner stems 13 extended through the counterbores 4 into the prongs 5.

The crystal 11, electrodes 11' and terminal plates 12 are of the same size, relatively, and of less width than the cavity 2, to space the side edges thereof from the edges of said cavity. The bottom of the cavity 2 is formed with a pair of spaced apart prongs 14 in the plane of the cavity 2, which support the terminal plates 12 and the crystal 11 and space the same from the bottom of the cavity 2, as well as the electrodes 11', forming part of the usual sandwich.

The cover 8 is provided with a pair of prongs 15 depending into the cavity 2, and similar in arrangement to the prongs 14, but spaced further apart, said prongs 15 bearing against the top edges of the terminal plates 12 and the crystal 11 and electrodes 11' spacing the same from the body of the cover 8.

The side walls of the cavity 2 are recessed, as at 16, so that the terminal plates 12 are spaced from said walls. On one side of the sandwich, a wafer 17 of "apmite" paper is opposed to one terminal plate 12, and a preferably convolute spring 18 is interposed between said wafer and the adjacent side wall of the cavity 2, all for a purpose presently understood.

A rectangular gasket 19, of "neoprene" or similar material, is interposed between the cover 8 and the top end of the body 1, and which is apertured, as at 20, for the extension of the screws 9 therethrough, and as at 21, to accommodate the prongs 15. A groove 22 is provided in the top end of the body 1 to receive a bead 23 on the gasket 19, whereby said gasket provides for hermetically sealing the top, or open end of the body 1.

As will now be seen, in the described embodiment of my improved holder, the sandwich parts may be quickly and easily assembled in the cavity 2 from the top end of the body 1, and said body hermetically sealed by attachment of the cover 8 and the gasket 19. Also the sandwich parts in the said cavity 2 are surrounded by an air gap, with the exception of the points of contact of the prongs 14, 15 therewith, so that the sandwich is adequately insulated from the body 1 and the cover 8, while at the same time it is maintained in place in said cavity, or, in other words, in the holder. As will be apparent, the body 1 and cover 8 may be inexpensively molded each in one piece.

In the embodiment illustrated in Figures 10 to 15, the body 24 of the holder is substantially of flat, square shape, with a circular central side cavity 25 therein, and a relatively larger, annular internally threaded recess 26 in the front side thereof forming a socket around the mouth of the cavity for a threaded closure disk 27, having a pair of diametrically opposite recesses 28 therein for use in turning the disk through the medium of a suitable wrench. The cavity 25 opens at its bottom into a pair of counterbores 29, similar to counterbores 4, and which are aligned with a pair of depending prongs 30 similar to the prongs 5.

The crystal 31 of the sandwich, in this instance, is interposed between a pair of disk-like, dished electrodes 32, each designed with an annular, laterally offset, flat rim 33 for seating a circular or rectangular quartz crystal therebetween. The electrodes 32 are interposed between a pair of circular, disk-like, terminal plates 34, having tangential stems 35 extended through the counterbores 29 into the prongs 30. As illustrated, the crystal 31, electrodes 32, and terminal plates 34 fit in the cavity 25 sidewise. An annular, concentric, narrow rib 36 on the bottom, or back, wall of the cavity 25 spaces the sandwich from said wall. A "neoprene," annular gasket 37 is interposed between the closure disk 27 and the mouth of the cavity 25 to provide for hermetically sealing the cavity, and which is of smaller internal diameter than that of the cavity 25 to overlap the mouth of the latter and space the sandwich from said cover disk 27. The cover disk 27 is provided with an annular rib 38 on its rear face for biting into the gasket 37 to facilitate forming a seal.

The parts of the sandwich in the cavity 25 are maintained in tightly assembled relation by a suitable convolute spring 39 interposed between the cover disk 27 and one terminal plate 34, and which is anchored on one side in a suitable recess 39' provided in said cover plate.

As will now be apparent, by virtue of the described modified embodiment of holder, an insulation forming air gap is provided in the holder upon each side of the sandwich. The rims 33 of the electrodes 32 provide continuous, raised surfaces for seating the crystal 31 in place between the electrodes 32, in any angular position, which facilitates quick and easy assembly of these sandwich parts, and further provide for accuracy in seating the crystal.

The foregoing will, it is believed, suffice to impart a clear understanding of my invention without further explanation. Manifestly, the invention is susceptible of modification in other respects than as disclosed herein, and right is reserved to all modifications falling within the scope of the appended claims.

What I claim is:

1. A piezoelectric crystal holder comprising a rectangular flat body of insulation material having a circular central cavity therein opening into one side of the body, and an annular recess in said side larger in diameter than said cavity, a closure disk of insulation material for said cavity threaded into said recess, an annular rib on the bottom wall of the cavity, a sandwich assembly in said cavity including a pair of terminal plates, a pair of electrode plates interposed between said terminal plates, and a crystal interposed between said pair of electrode plates, and a spring interposed between said assembly and said cover disk and spacing the assembly from said disk, said rib spacing the assembly from the bottom of said cavity, said electrode plates being dished to provide an air gap between the same and said crystal upon each side of the latter.

2. A piezoelectric crystal holder comprising a rectangular flat body of insulation material having a circular central cavity therein opening into one side of the body, and an annular recess in said side larger in diameter than said cavity, a closure disk of insulation material for said cavity threaded into said recess, an annular rib on the bottom wall of the cavity, a sandwich assembly in said cavity including a pair of terminal plates, a pair of electrode plates interposed between said terminal plates, and a crystal interposed between said electrode plates, and a spring interposed between said assembly and said cover disk and spacing the assembly from said disk, said rib spacing the assembly from the bottom of said cavity, said electrode plates being dished to provide an air gap between the same and said crystal upon each side of the latter, and having continuous laterally offset rims for engaging the crystal at the margin of its faces.

3. A piezoelectric sandwich assembly comprising a pair of opposed disk-like terminal plates having stems extending tangentially from the edges thereof, a pair of circular electrode plates interposed between said terminal plates, and a crystal interposed between said electrode plates, said electrode plates being dished to provide air gaps between the same and said crystal upon each side of the latter.

4. A piezoelectric sandwich assembly comprising a pair of opposed disk-like terminal plates having stems extending tangentially from the edges thereof, a pair of circular electrode plates interposed between said terminal plates, and a crystal interposed between said electrode plates, said electrode plates being dished to provide air gaps between the same and said crystal upon each side of the latter, and being provided with laterally offset flat rims for engaging the crystal at the margin of its faces.

THEODORE W. KELLER.